United States Patent
Bryan et al.

(10) Patent No.: US 11,686,404 B2
(45) Date of Patent: Jun. 27, 2023

(54) REDUCING NOISE IN BALL VALVES

(71) Applicant: Dresser, LLC, Houston, TX (US)

(72) Inventors: Kyle McKinley Bryan, Jacksonville, FL (US); Jonathan Clyde Whitten, Orange Park, FL (US); Abdul Raoof Mohamed, Jacksonville, FL (US); Jeffrey Louis Johanning, Ponte Vedra, FL (US)

(73) Assignee: Dresser, LLC, Houston, TX (US)

( * ) Notice: Subject to any disclaimer, the term of this patent is extended or adjusted under 35 U.S.C. 154(b) by 159 days.

(21) Appl. No.: 17/119,650

(22) Filed: Dec. 11, 2020

(65) Prior Publication Data

US 2022/0186857 A1 Jun. 16, 2022

(51) Int. Cl.
| | |
|---|---|
| *F16K 27/06* | (2006.01) |
| *F16K 5/06* | (2006.01) |
| *F16K 47/02* | (2006.01) |
| *F16K 47/08* | (2006.01) |
| *F16K 47/04* | (2006.01) |

(52) U.S. Cl.
CPC .......... *F16K 27/067* (2013.01); *F16K 5/0605* (2013.01); *F16K 5/0621* (2013.01); *F16K 5/0689* (2013.01); *F16K 47/02* (2013.01); *F16K 47/045* (2013.01); *F16K 47/08* (2013.01)

(58) Field of Classification Search
CPC .... F16K 5/0621; F16K 5/0605; F16K 5/0689; F16K 27/067; F16K 47/02; F16K 47/045; F16K 47/04; F16K 47/08
See application file for complete search history.

(56) References Cited

U.S. PATENT DOCUMENTS

| | | | | |
|---|---|---|---|---|
| 3,157,190 A | * | 11/1964 | Allen | F16K 5/00 251/315.08 |
| 3,348,804 A | * | 10/1967 | Piccardo | F16K 41/00 251/367 |
| 3,458,172 A | * | 7/1969 | Burrows | F16K 5/0621 137/315.19 |
| 3,484,079 A | * | 12/1969 | Reagan | F16K 5/0642 251/309 |
| 3,737,145 A | * | 6/1973 | Heller | F16K 27/067 251/315.08 |
| 3,883,112 A | * | 5/1975 | Milleville | F16K 5/0673 251/315.08 |

(Continued)

FOREIGN PATENT DOCUMENTS

| | | |
|---|---|---|
| JP | 2008185113 A | 8/2008 |
| KR | 102130102968 A | 9/2013 |
| KR | 101619447 A | 5/2016 |

*Primary Examiner* — David Colon-Morales
(74) *Attorney, Agent, or Firm* — Paul Frank + Collins P.C.

(57) ABSTRACT

A component for a ball valve that is configured to reduce noise. The component or "shoe" can install into the valve body, for example, on a downstream side of a throttling ball. In one implementation, the embodiments comprise an annular ring with an inner surface and an outer surface. The inner surface is cupped to receive a portion of the throttling ball. The outer surface may have a stepped profile with portions of the annular ring that have concentrically-decreasing diameter. This stepped profile sits in a corresponding recess in the valve body. Welds can be used to secure the shoe in place in lieu of fasteners, like bolts or screws.

16 Claims, 10 Drawing Sheets

(56) References Cited

U.S. PATENT DOCUMENTS

| | | | |
|---|---|---|---|
| 4,235,003 A * | 11/1980 | Gachot | F16K 27/067 29/890.129 |
| 4,337,919 A * | 7/1982 | Ripert | F16K 5/0647 251/315.08 |
| 4,364,415 A | 12/1982 | Polon | |
| 4,479,510 A | 10/1984 | Bey | |
| 4,562,860 A * | 1/1986 | Walter | F16K 5/0636 251/315.08 |
| 4,813,649 A * | 3/1989 | Takeda | F16K 5/0678 403/348 |
| 4,881,718 A * | 11/1989 | Champagne | F16K 5/0605 251/316 |
| 5,070,909 A | 12/1991 | Davenport | |
| 5,180,139 A | 1/1993 | Gethmann et al. | |
| 5,251,664 A * | 10/1993 | Arvidsson | F16K 47/02 137/539.5 |
| 5,287,889 A | 2/1994 | Leinen | |
| 5,332,004 A | 7/1994 | Gethmann et al. | |
| 5,400,825 A | 3/1995 | Gethmann et al. | |
| 5,437,305 A | 8/1995 | Leinen | |
| 5,482,249 A * | 1/1996 | Schafbuch | F16K 47/08 138/44 |
| 5,509,446 A | 4/1996 | Bey | |
| 5,511,584 A | 4/1996 | Leinen | |
| 5,524,863 A * | 6/1996 | Davis | B08B 9/00 251/127 |
| 5,680,889 A * | 10/1997 | Boger | F16K 5/12 251/121 |
| 5,758,689 A | 6/1998 | Leinen | |
| 5,771,929 A | 6/1998 | Boger | |
| 5,868,378 A * | 2/1999 | McMahon | F16K 5/0647 251/315.08 |
| 5,890,505 A * | 4/1999 | Boger | F16K 5/06 138/40 |
| 5,988,586 A * | 11/1999 | Boger | F16K 47/08 138/44 |
| 6,029,702 A | 2/2000 | Leinen | |
| 6,643,929 B2 * | 11/2003 | Yokomi | F16K 27/107 29/890.128 |
| 6,988,708 B2 | 1/2006 | Caprera | |
| 7,178,782 B1 | 2/2007 | York | |
| 7,234,488 B2 * | 6/2007 | Partridge | F16K 5/12 251/127 |
| 7,690,626 B2 * | 4/2010 | Stunkard | F16K 5/0642 251/315.08 |
| 8,141,843 B2 | 3/2012 | Rimboyn et al. | |
| 8,807,530 B2 * | 8/2014 | Yang | F16L 47/02 251/315.11 |
| 9,091,352 B2 * | 7/2015 | Fukano | F16K 5/201 |
| 9,103,449 B2 * | 8/2015 | Saldivar | F16K 5/0647 |
| 10,060,538 B2 * | 8/2018 | Corte, Jr. | F16K 5/0689 |
| 10,221,963 B2 * | 3/2019 | Eilers | F16K 47/045 |
| 10,544,868 B2 * | 1/2020 | Bell | F16K 27/067 |
| 11,041,571 B2 * | 6/2021 | Volkens | F16K 47/08 |
| 11,067,179 B2 * | 7/2021 | Shelton | F16K 27/06 |
| 11,131,404 B2 * | 9/2021 | Hoots | F16K 5/0626 |
| 2010/0258193 A1 * | 10/2010 | Christenson | F16K 47/08 251/315.01 |
| 2013/0037738 A1 | 2/2013 | Matsuoka et al. | |
| 2017/0138504 A1 * | 5/2017 | Hoots | F16K 5/0642 |
| 2018/0245697 A1 * | 8/2018 | Shelton | F16K 5/0689 |

* cited by examiner

REDUCING NOISE IN BALL VALVES

BACKGROUND

Flow controls play a role in many industrial facilities and systems. Ball valves are a type of flow control that find use in, for example, installations and networks that distribute fluids, like natural gas, vapor, water, or petroleum. One problem that subsists with these devices, though, is that the fluids may flow at rates high enough to generate vibration as it transits through the device. If left unchecked, the vibration results in loud noise, oftentimes in excess of acceptable safety levels. Many ball valves incorporate counter measures, including additional parts (or "trim"), that are meant to attenuate flow and suppress this noise.

SUMMARY

The subject matter of this disclosure relates to trim that suppresses noise in valves. Of particular interest are embodiments of a component (or "shoe") that can integrate into structure of ball valves. As noted more below, certain implementations may be part of ball valves that are configured to throttle flow of fluids. These devices may have a rotatable closure member, or throttling ball, with a central opening or aperture. An end user can set this aperture in position relative to the fluid flow through the valve. This throttling position restricts flow and, often, introduces pressure loss or drop across the throttling ball. This localized pressure drop may cause vibration or noise problems. The shoe may have geometry that is useful to reduce errant flow that can cause vibrations, which is also a root cause of the noise. As an added benefit, the geometry may also allow the shoe to secure to the valve structure much better than with conventional fasteners (e.g., bolts). Welds around the periphery of the shoe avoid potential loosening of the shoe that may occur in operation in the field.

DRAWINGS

Reference is now made briefly to the accompanying drawings, in which.

Figure 1:
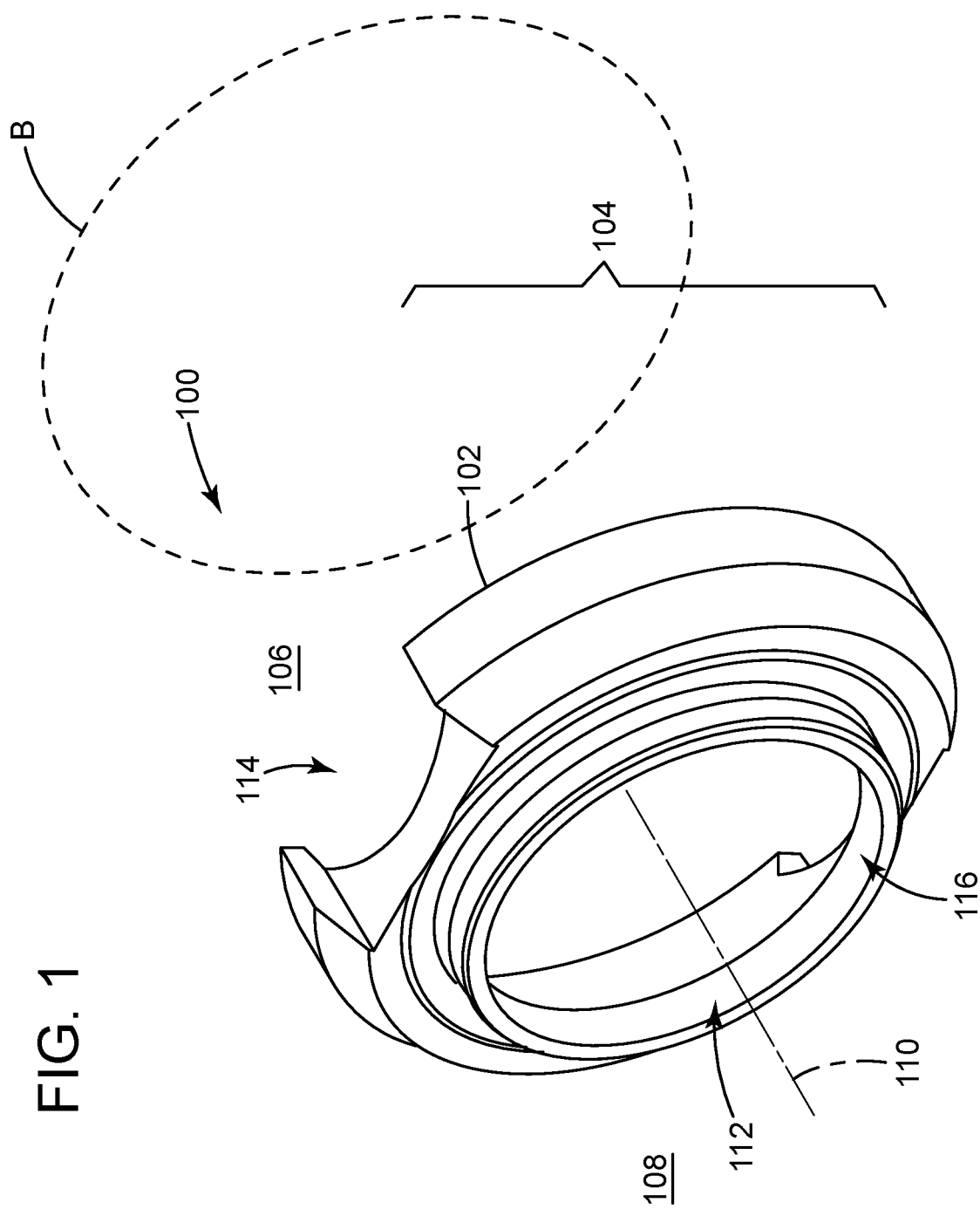
FIG. 1 depicts a perspective view from the back of an exemplary embodiment of a shoe for use in ball valves.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These embodiments are useful to throttle flow of fluids through ball-type valves. This feature suppresses noise that may emanate from the valves because of pressure drop at low (or lower) flow rates. As noted below, the embodiments may include a shoe that secures into a valve body with a rotatable ball resident therein. The geometry may also accommodate certain mounting hardware found in the valve, for example, plates (or "trunnions") that support the rotatable ball in place in the valve body. Other embodiments are contemplated within the scope of this disclosure.

FIG. 1 depicts a perspective view from the back of an example of a shoe 100 for use to attenuate noise in ball valves. This example has a body 102 preferably made of machined, cast, or printed metals, like aluminum or steel. The body 102 may form an annular ring 104 with a first side 106, a second side 108, and a central axis 110 extending therebetween. The annular ring 104 forms a bore 112 that terminates at openings (e.g., a first opening 114 and a second opening 116) on both sides 106, 108. When installed in ball valves, the bore 112 permits flow through the annular ring 104. The first opening 114 can receive a portion of a throttling ball B. This portion may be hemispherical, for example, the leading edge of the throttling ball B. The second opening 116 is typically smaller than the first opening 114.

Figure 2:
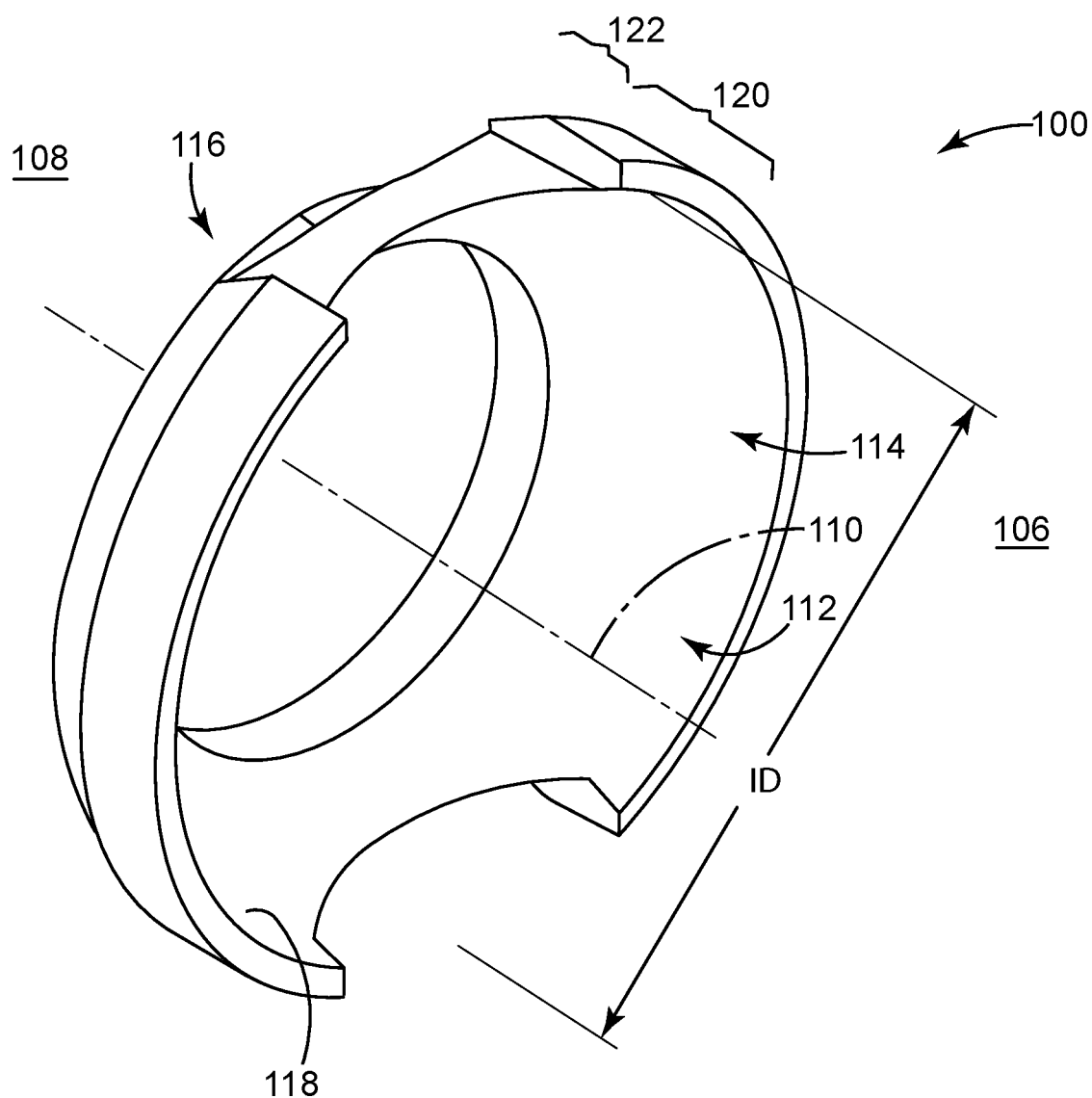
FIG. 2 depicts a perspective view from the front of the shoe of FIG. 1.

FIG. 2 shows a perspective view from the front of the shoe 100 of FIG. 1. The bore 112 has an inner surface 118 with an inner diameter ID. The inner surface 118 may have geometry that includes a first portion 120 and a second portion 122. The first portion 120 may correspond with a reduction in the inner diameter ID from the first opening 114 toward the second opening 116. The reduction may form an arcuate or "cupped" shape, for example, with a radius that matches the radius of the throttling ball B (FIG. 1). The cupped shape provides more predictable control of pressure drop through ball valves. As also shown, the arcuate shape may terminate at the second portion 122 where the inner diameter ID may remain constant to the second opening 116.

Figure 3:
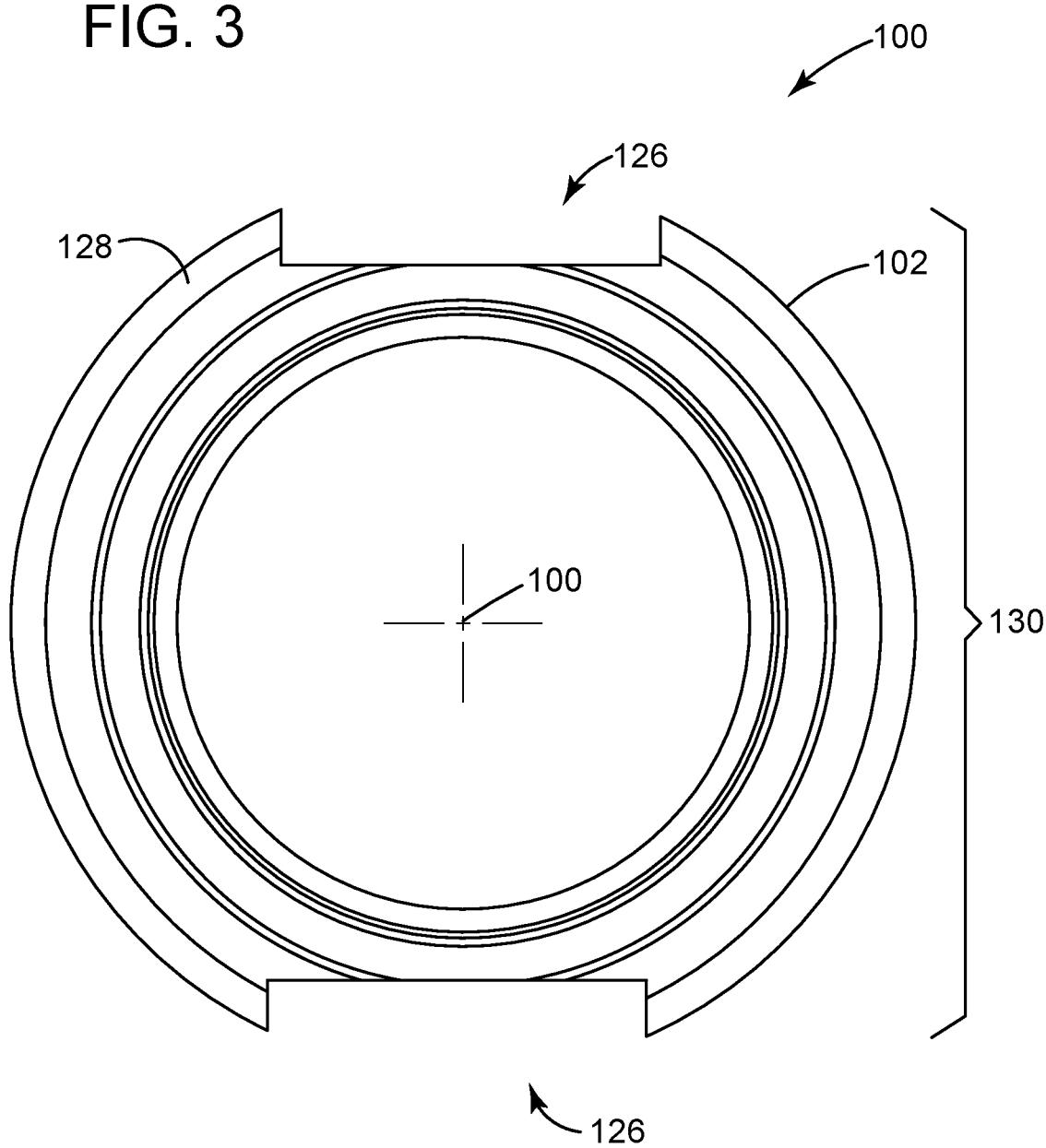
FIG. 3 depicts an elevation view from the back of the shoe of FIG. 1.

FIG. 3 shows an elevation view from the back of the shoe 100 of FIG. 1. The annular ring 104 may have a pair of cutouts 126 that penetrate its otherwise annular outer surface 128. The cutouts 126 may reside diametrically opposite of one another. This feature is useful for the shoe 100 to accommodate existing structure in ball valves. As also shown, the outer surface 128 may have a stepped profile 130 that features a number of concentric portions, each corresponding with a change in an outer diameter OD of the annular ring 104. These concentric portions may match corresponding features in structure on ball valves to fit proximate the throttling ball B (FIG. 1).

Figure 4:
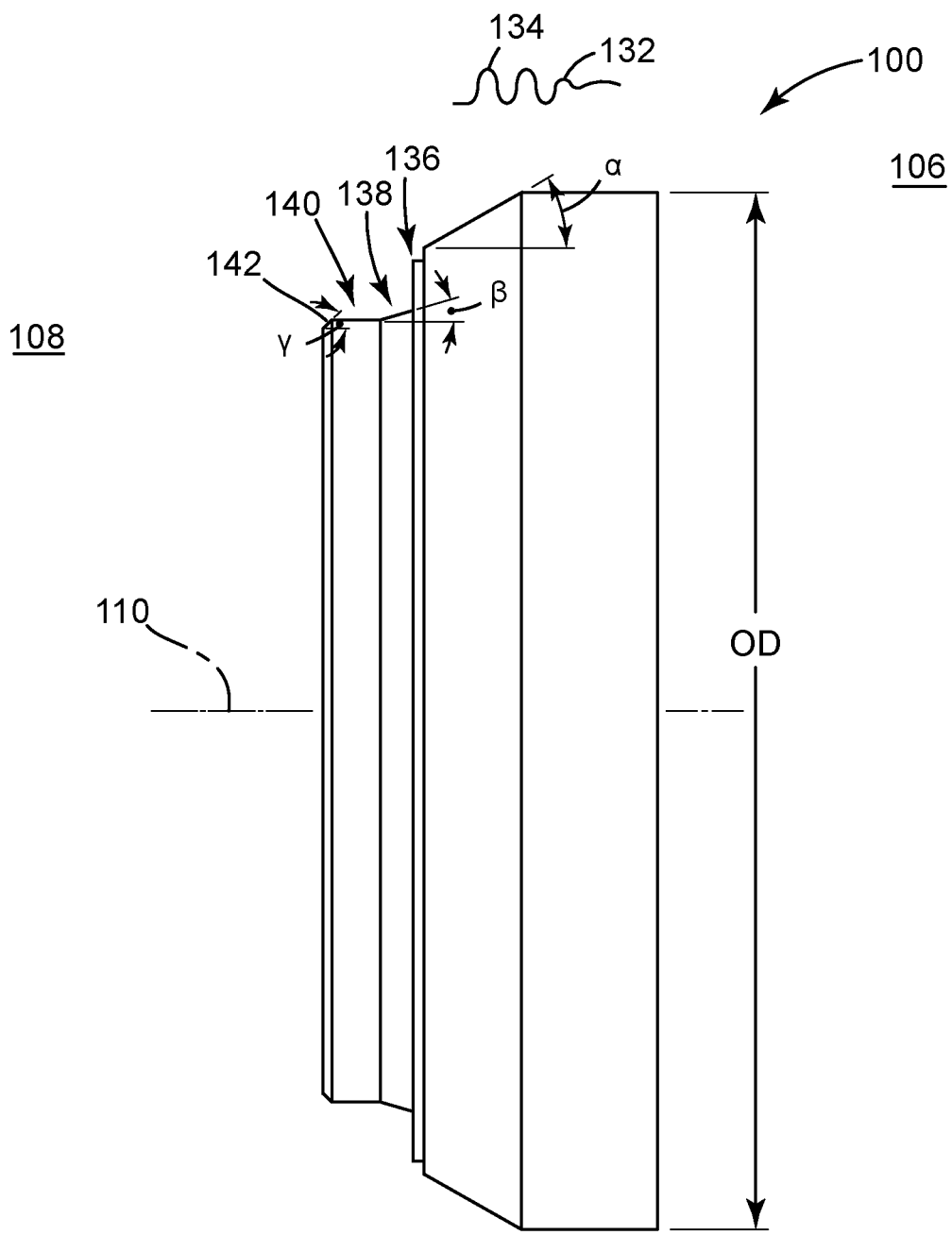
FIG. 4 depicts an elevation view from the side of the shoe of FIG. 1.

FIG. 4 shows an elevation view from the side of the shoe 100 of FIG. 1. Moving from the first side 106 towards the second side 108, the concentric portions may include a first portion 132 in which the outer diameter OD remains constant. A second portion 134 may result from a linear decrease in the outer diameter OD at angle α. The outer diameter OD may step down again to form a third portion 136 and a fourth portion 138. The outer surface 128 in the fourth portion 138 may result from another linear decrease in the outer diameter OD at angle β. A fifth portion 140 may correspond with values for the outer diameter OD that remain constant, as well. In one implementation, the stepped profile 130 may include a sixth portion 142 that results from a linear decrease in the outer diameter OD at angle γ. In various implementations, values for angles α, β, γ may vary in a range of from about 15° to about 85°. These values may depend on design parameters for application of the shoe 100 in ball valves (or other devices), among other considerations.

Figure 5:
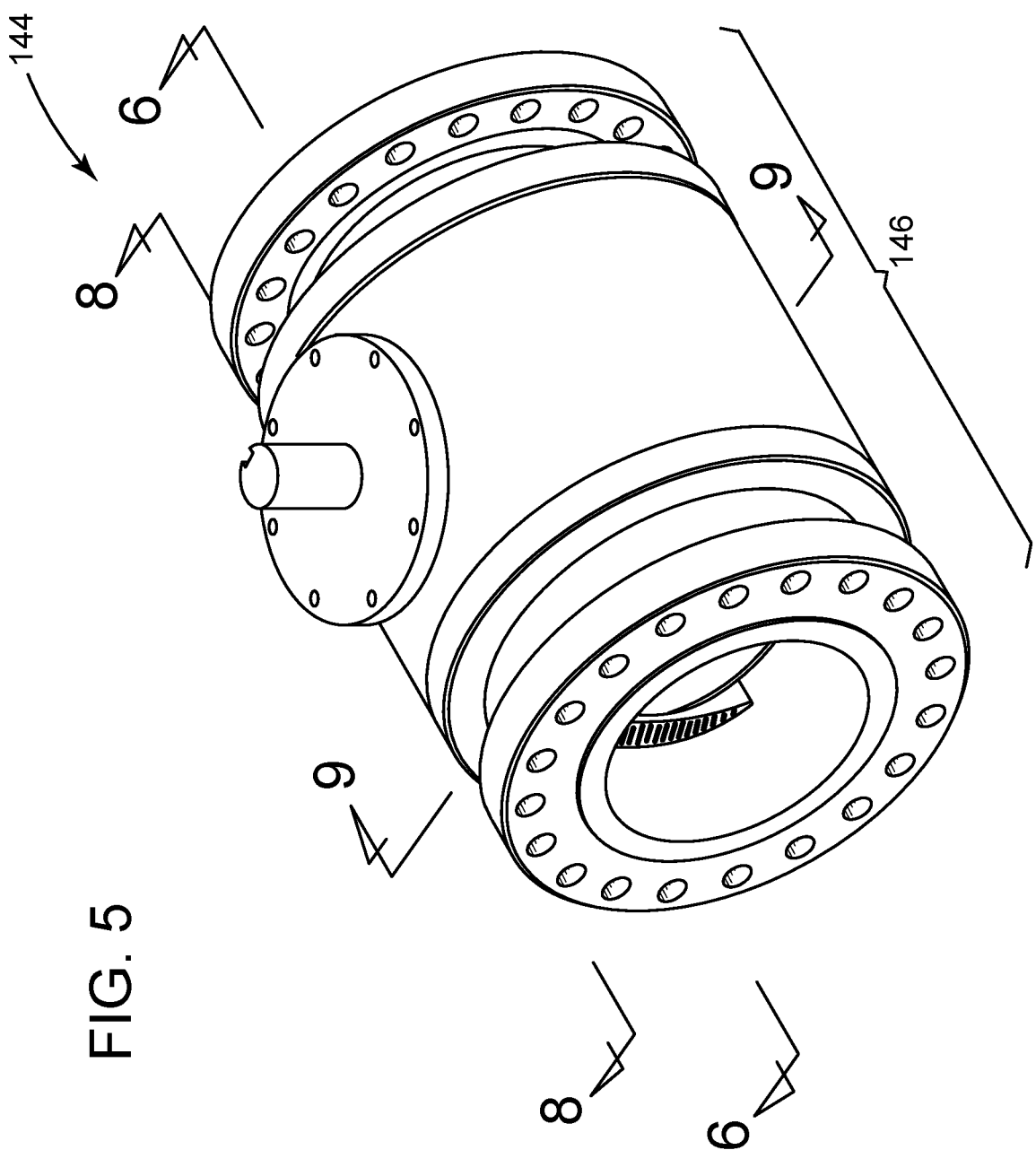
FIG. 5 depicts a perspective view of an example of a valve that can employ the shoe of FIG. 1.

FIG. 5 depicts a perspective view of an example of a valve 144 that may employ the shoe 100 of FIG. 1. The valve 144 may include a valve body 146, typically made of metal. The valve body 146 may be configured as a ball-style valve, where the throttling ball B (FIG. 1) resides inside. These types of valves may have one of several operative configurations that depend on the orientation of the throttling ball B (FIG. 1). In one configuration, the throttling ball B (FIG. 1) has two distinct positions, e.g., open or closed. Other configurations use the throttling ball B (FIG. 1) to decrease (or increase) flow through the device.

Figure 6:
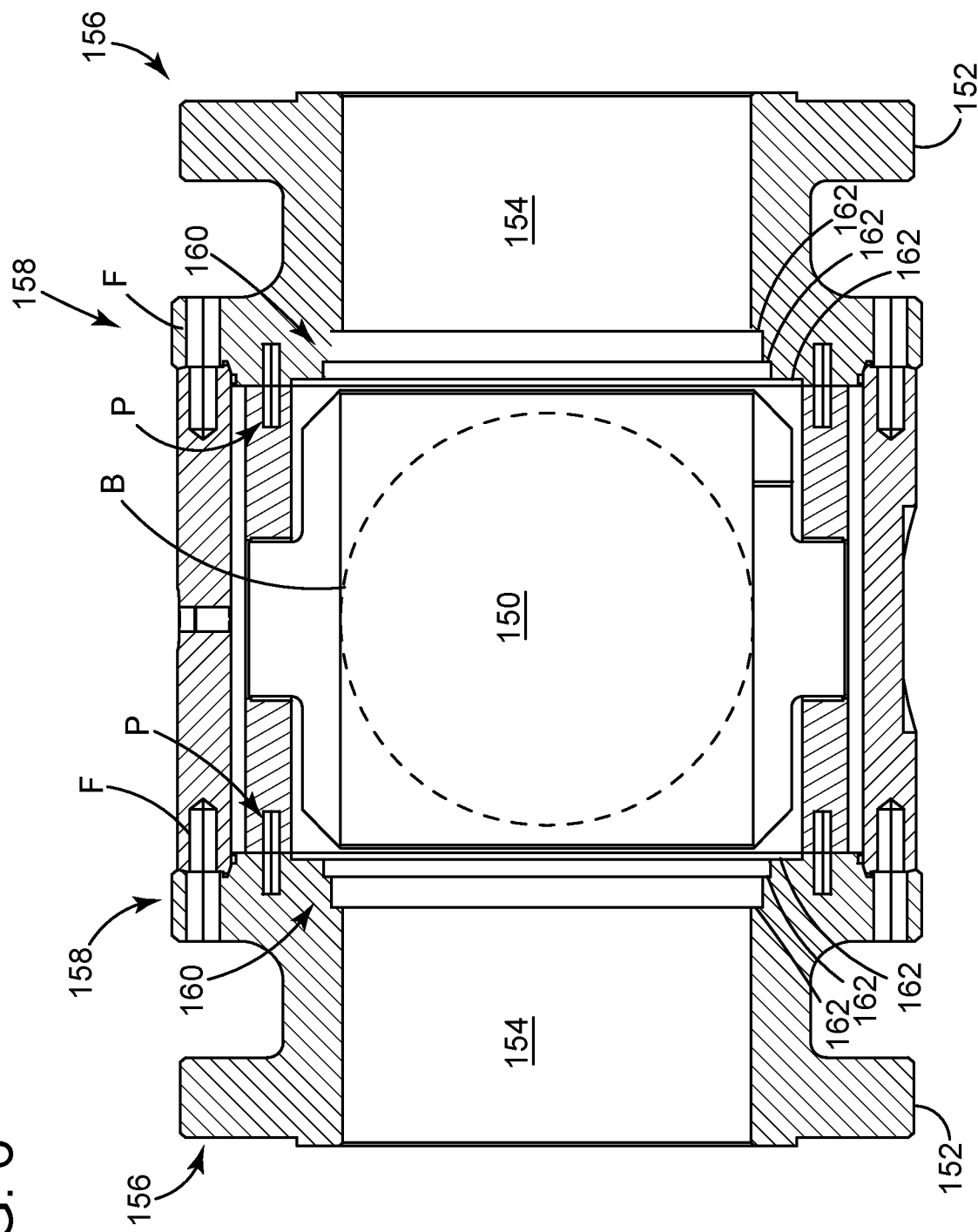
FIG. 6 depicts an elevation view of a first cross-section of the valve of FIG. 5.
Figure 7:
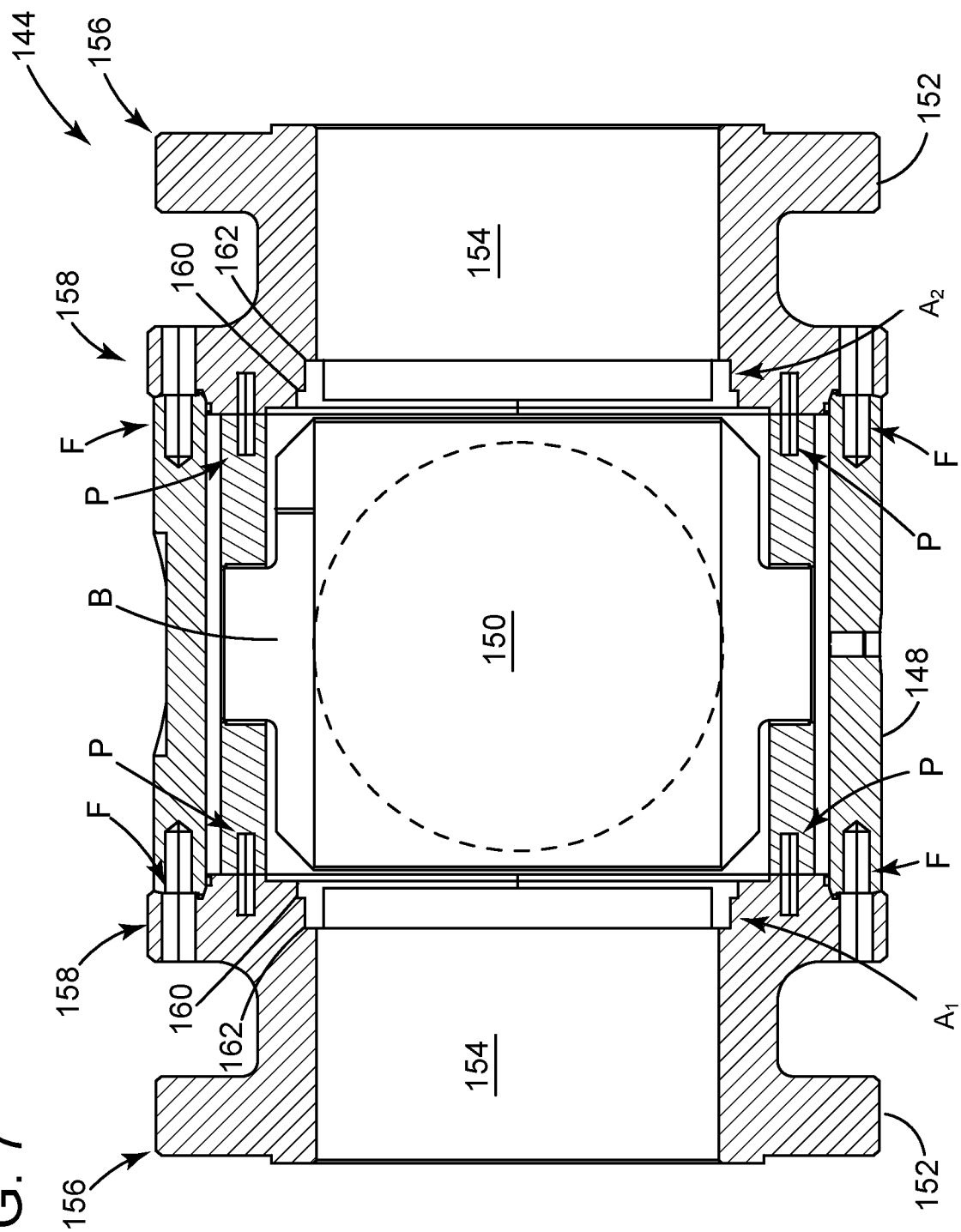
FIG. 7 depicts the first cross-section of FIG. 6.

FIGS. 6 and 7 depict an elevation view of the cross-section of the valve 144 of FIG. 5 taken at line 6-6. Some parts have been removed for clarity. FIG. 6 shows that the valve body 146 may have a central cylinder 148 with a cavity 150 to receive the throttling ball B. The valve body 146 may also include a pair of closures 152 with a through-bore 154. The closures 152 may have an end 156 that is flanged to couple with pipes or conduit to allow ingress and egress of material into the valve 144. Other configurations for the end 156 may employ different connection features, like weld ends, pipe fittings, socket weld flanges, or ring joints. The other end 158 of the closures 152 may secure to opposite ends of the cylinder 148. Fasteners F and alignment pins P may be useful for this purpose. In one implementation, the end 158 may have recess 160 with a stepped profile that forms shoe mating surface 162. This stepped profile may substantially follow or match the stepped profile 130 of the outer surface 128 on the shoe 100. As best shown in FIG. 7, this feature permits the shoe 100 to insert into the recess 160. Various portions of the outer surface 126 seat or abut (preferably in contact with) the mating surfaces 162. Configurations for the valve 144 may include one or both of the shoes $A_1$, $A_2$. In one implementation, only one of the shoes (e.g., shoe $A_1$ or $A_2$) may be present, for example, downstream of the throttling ball B.

Figure 8:
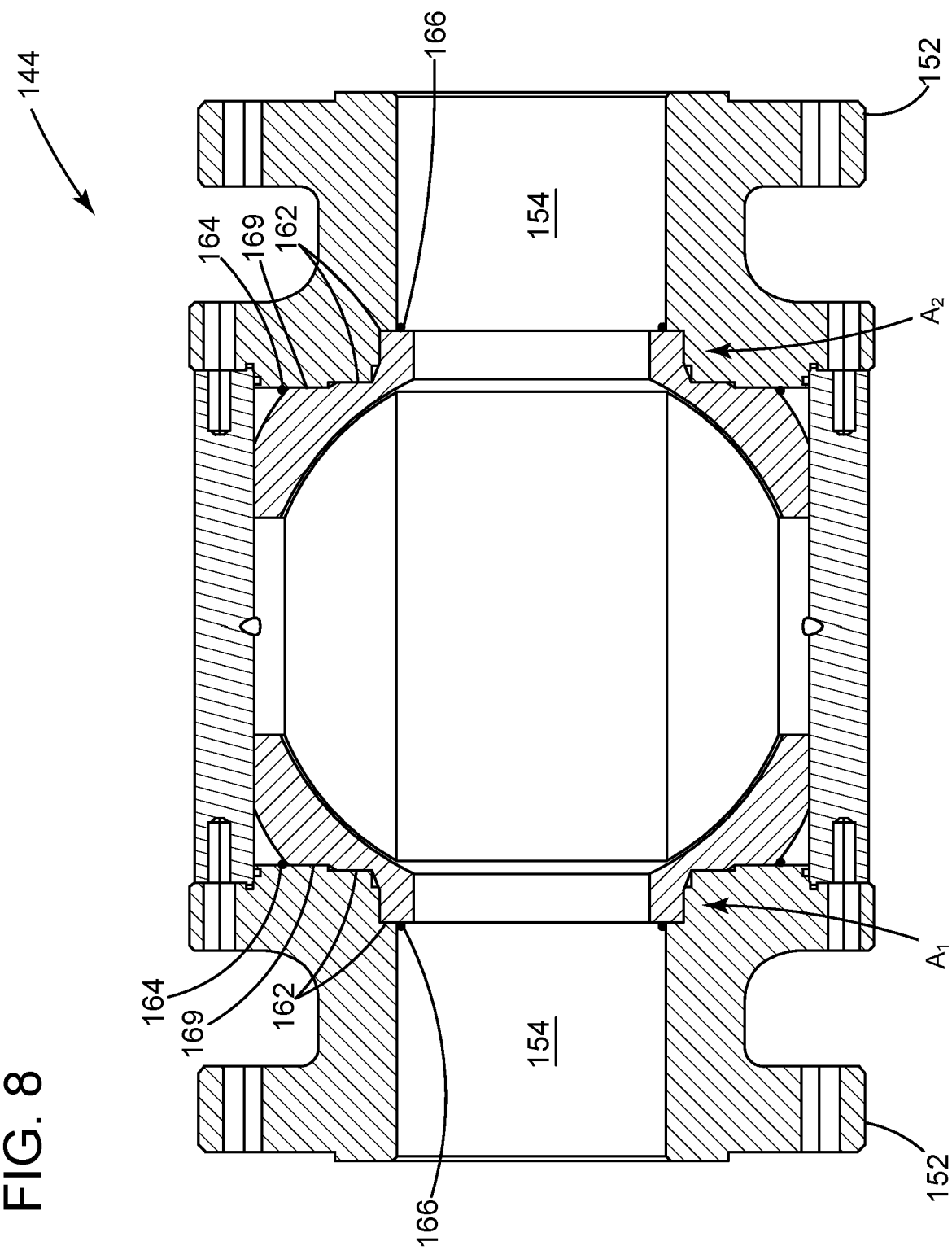
FIG. 8 depicts an elevation view of a second cross-section of the valve of FIG. 5.

FIG. 8 is a cross-section of the valve 144 of FIG. 5 taken at line 8-8. Fastening elements 164, 166 can be used to secure the shoe 100 (e.g., shoe $A_1$, $A_2$) to a forward-facing surface 169 of the closures 152 and to the through-bore 154 (for example, at its inner surface). Examples of the fastening elements 164, 166 may include welds; however, it is possible that adhesives of appropriate composition or like adhering materials or techniques will work as well. In one implementation, welds 164, 166 may circumscribe the central axis 110 of the annular ring 104 in whole or in part. This structure has been found to perform better than fasteners to secure the shoe 100 (e.g., shoes $A_1$, $A_2$) in position in the valve body 146 because welds avoid any potential loosening of the shoe 100 (e.g., shoes $A_1$, $A_2$) in the field.

Figure 9:
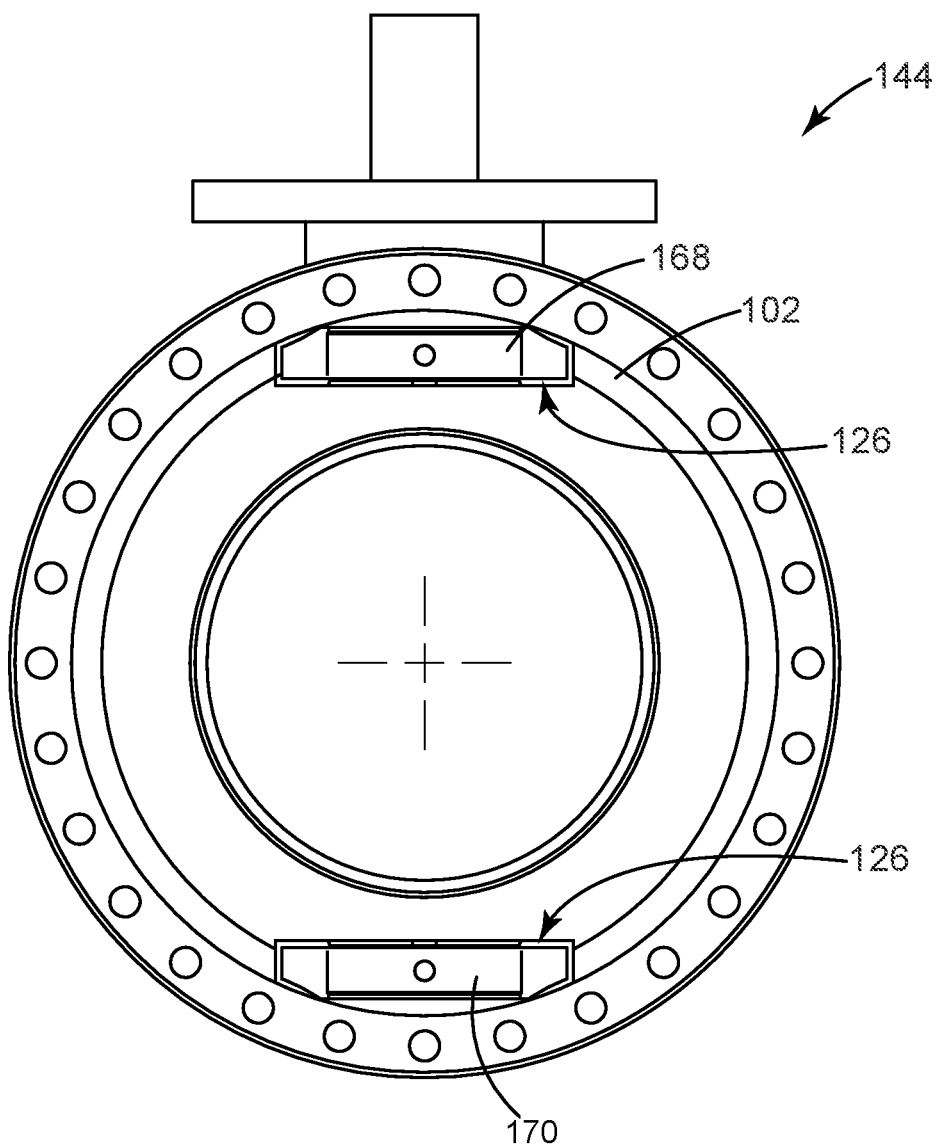
FIG. 9 depicts an elevation view of a third cross-section of the valve of FIG. 5.

FIG. 9 depicts an elevation view of the cross-section of the valve 144 of FIG. 5 taken at line 9-9. The valve 144 may include plate trunnions (e.g., a first plate 168 and a second plate 170). The plates 168, 170 may reside on opposite sides of the throttling ball B. As noted above, the cutouts 126 provide clearance for the shoe 100 (e.g., shoes A, B) to mount to the closures 152.

Figure 10:
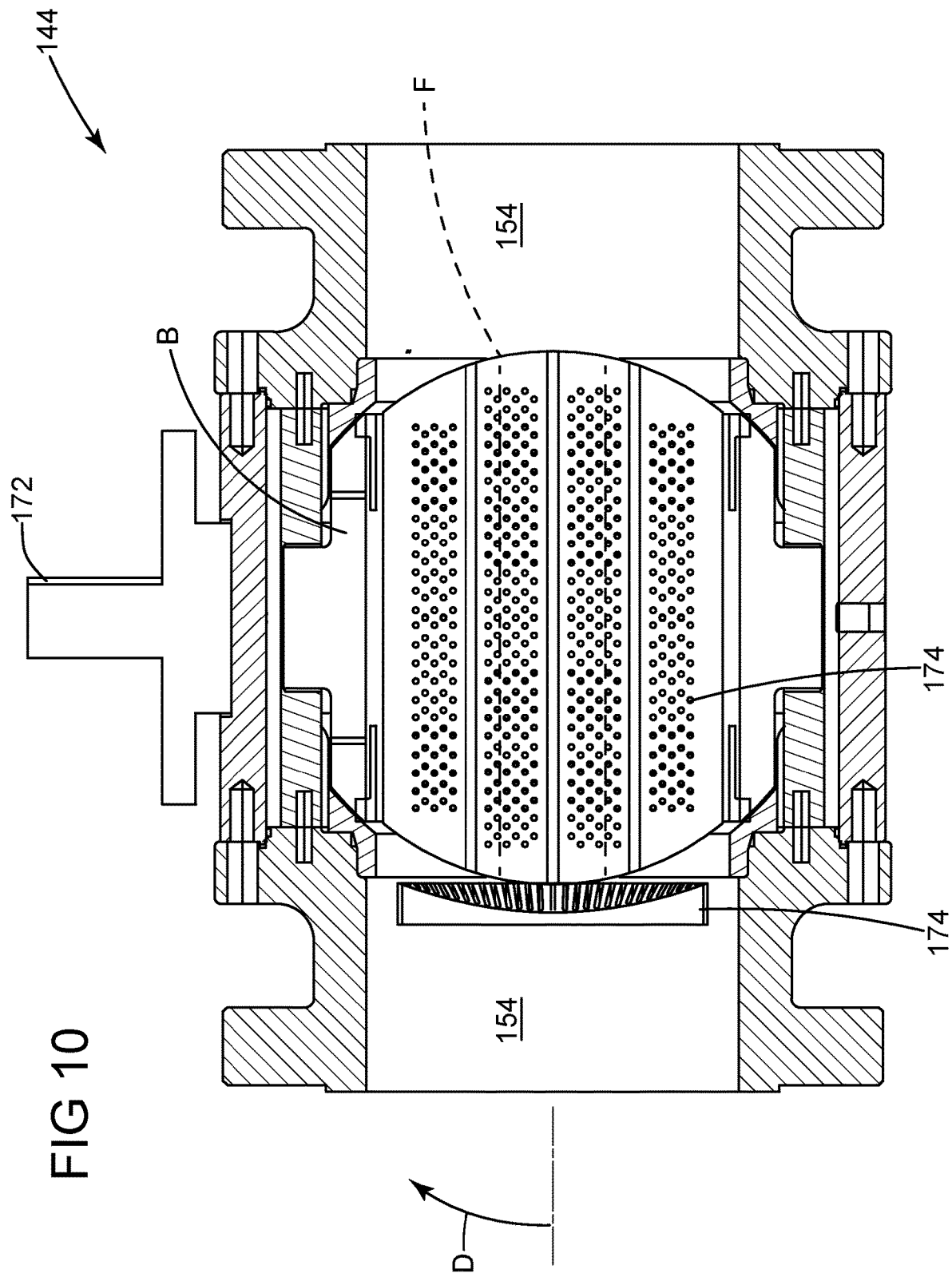
FIG. 10 depicts an elevation view of the cross-section of the valve of FIG. 7.

FIG. 10 depicts the elevation view of the cross-section of the valve 144 of FIG. 5. Parts have been included to fill out the current description. As shown, the valve 144 may include an actuator shaft 172 that may penetrate through the cylinder 148 to engage with the throttling ball B. An actuator may connect with the shaft 172 to rotate the throttling ball B to different orientations. This feature adjusts an angle D of the flowpath F relative to the through-bores 154 on the closures 152. The angle D manages flow through the valve 144. The shoe 100 is particular beneficial for orientations of the throttling ball B that set that angle D at around 30°. In one implementation, the valve 144 may also include a trim kit 174 that is configured to force material through holes or at angles that reduce pressure. The trim kit 174 may embody various pieces or parts that integrate as part of the throttling ball B. Other pieces or parts may install into the valve 144, separate from the throttling ball B but in position to intercept the flow as it transits the device. The frictional pathway that results from the trim kit 174 reduces velocity of the material, which in turn reduces vibration and cavitation. The result may be noise attenuation, for example, on the order of 25 dBa or more.

In view of the foregoing, the improvements herein help to suppress noise in ball valves. The embodiments address noise that occurs due to flow through the device. The embodiments also have geometry and features that permit use on plate trunnion-style ball valves. These features further permit welds to attach the embodiments in place on these devices. Notably, the same design for the shoe 100 may install onto pin trunnion-style ball valves, as well.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A valve, comprising:
a valve body;
a rotatable throttling ball disposed in the valve body;
a shoe resident in the valve body and having an end to receive at least a portion of the rotatable throttling ball;
welds securing the shoe to the valve body; and
a trunnion plate disposed on at least one side of the rotatable throttling ball,
wherein the shoe comprises a cutout that aligns with the trunnion plate.
2. The valve of claim 1, wherein the shoe comprises a second cutout which is diametrically opposite of the cutout.

3. The valve of claim 1, wherein the end of the shoe forms a cupped surface to receive the portion of the rotatable throttling ball.

4. The valve of claim 1, wherein the end of the shoe forms a cupped surface having a radius that matches the radius of the rotatable throttling ball.

5. The valve of claim 1, wherein the shoe comprises an outer surface with a stepped profile.

6. The valve of claim 1, wherein the shoe has an outer surface with a stepped profile that fits into a corresponding stepped profile on the valve body.

7. A valve, comprising:
a valve body;
a rotatable throttling ball disposed in the valve body;
a shoe resident in the valve body and having an end to receive at least a portion of the rotatable throttling ball;
welds securing the shoe to the valve body; and
trunnion plates disposed on opposite sides of the rotatable throttling ball,
wherein the shoe comprises cutouts that align with the trunnion plates.

8. A valve, comprising:
a valve body;
a rotatable throttling ball disposed in the valve body;
a shoe resident in the valve body and having an end to receive at least a portion of the rotatable throttling ball; and
welds securing the shoe to the valve body,
wherein the welds are disposed on two separate surfaces of the valve body.

9. A valve, comprising:
a valve body;
a rotatable throttling ball disposed in the valve body;
a shoe resident in the valve body and having an end to receive at least a portion of the rotatable throttling ball; and
welds securing the shoe to the valve body,
wherein the welds are disposed on two separate surfaces of the shoe.

10. A valve, comprising: a rotatable ball; and an annular ring disposed on at least one side of the rotatable ball, the annular ring having: an inner surface that is cupped to receive at least a portion of the rotatable ball, an outer surface that has a stepped profile, and diametrically opposed cutouts in the outer surface, a central cylinder with an inner cavity to receive the rotatable ball; closures disposed on either end of the central cylinder, the closures comprising a through-bore; and welds securing the annular ring to a surface of the through-bore and to a forward-facing mating surface on one of the closures.

11. The valve of claim 10, further comprising a valve body, at least part of which forms mating surfaces that are in contact with the stepped profile of the outer surface of the annular ring.

12. The valve of claim 10, wherein the welds circumscribe the outer surface of the annular ring.

13. The valve of claim 10, wherein the welds circumscribe the outer surface of the annular ring in two places on the stepped profile.

14. A valve, comprising:
a rotatable ball; and
an annular ring disposed on at least one side of the rotatable ball, the annular ring having:
an inner surface that is cupped to receive at least a portion of the rotatable ball,
an outer surface that has a stepped profile, and
diametrically opposed cutouts in the outer surface,
a central cylinder with an inner cavity to receive the rotatable ball;
closures disposed on either end of the central cylinder, the closures comprising a through-bore and a recess concentric with the through-bore; and
welds securing the annular ring to a surface of the through-bore and to a forward-facing surface on one of the closures,
wherein the annular ring fits into the recess.

15. The valve of claim 14, wherein the welds circumscribe the outer surface of the annular ring.

16. The valve of claim 14, wherein the welds circumscribe the outer surface of the annular ring in two places on the stepped profile.

* * * * *